Sept. 8, 1942.　　　　　H. C. CLAY　　　　　2,295,161
HYDRAULIC CONTROL MECHANISM
Filed March 7, 1939　　　　4 Sheets-Sheet 1

INVENTOR.
Harry C. Clay,
BY
Hood & Hahn.
ATTORNEYS.

Sept. 8, 1942.   H. C. CLAY   2,295,161
HYDRAULIC CONTROL MECHANISM
Filed March 7, 1939   4 Sheets-Sheet 2
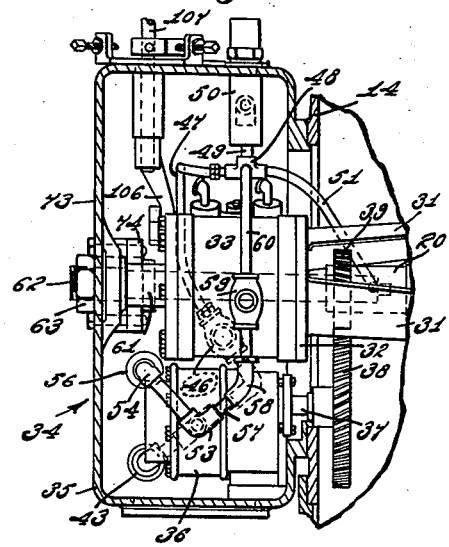
INVENTOR.
Harry C. Clay,
BY Hood & Hahn.
ATTORNEYS.

Sept. 8, 1942.  H. C. CLAY  2,295,161
HYDRAULIC CONTROL MECHANISM
Filed March 7, 1939  4 Sheets-Sheet 3
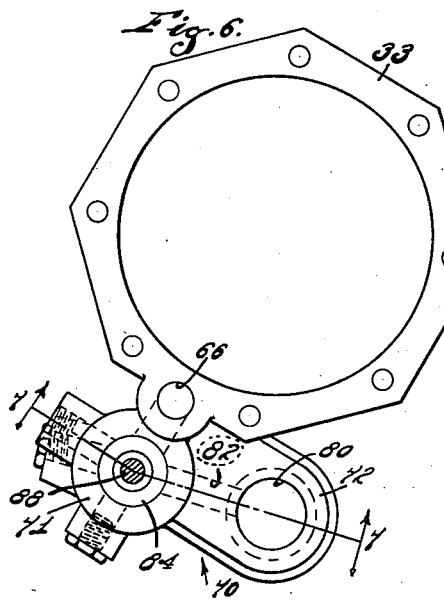
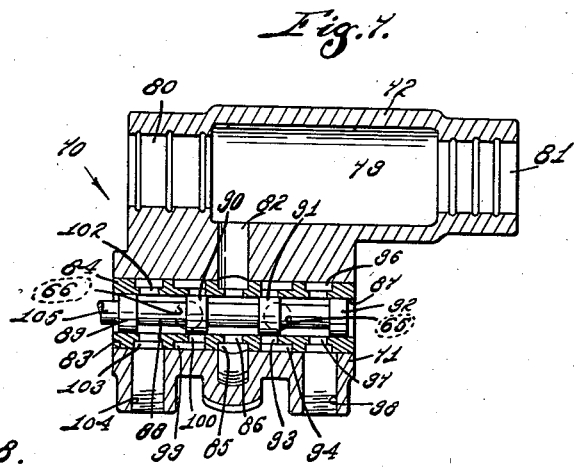
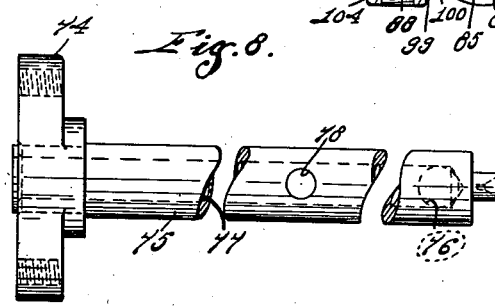
INVENTOR.
BY Harry C. Clay,
Hood + Hahn.
ATTORNEYS.

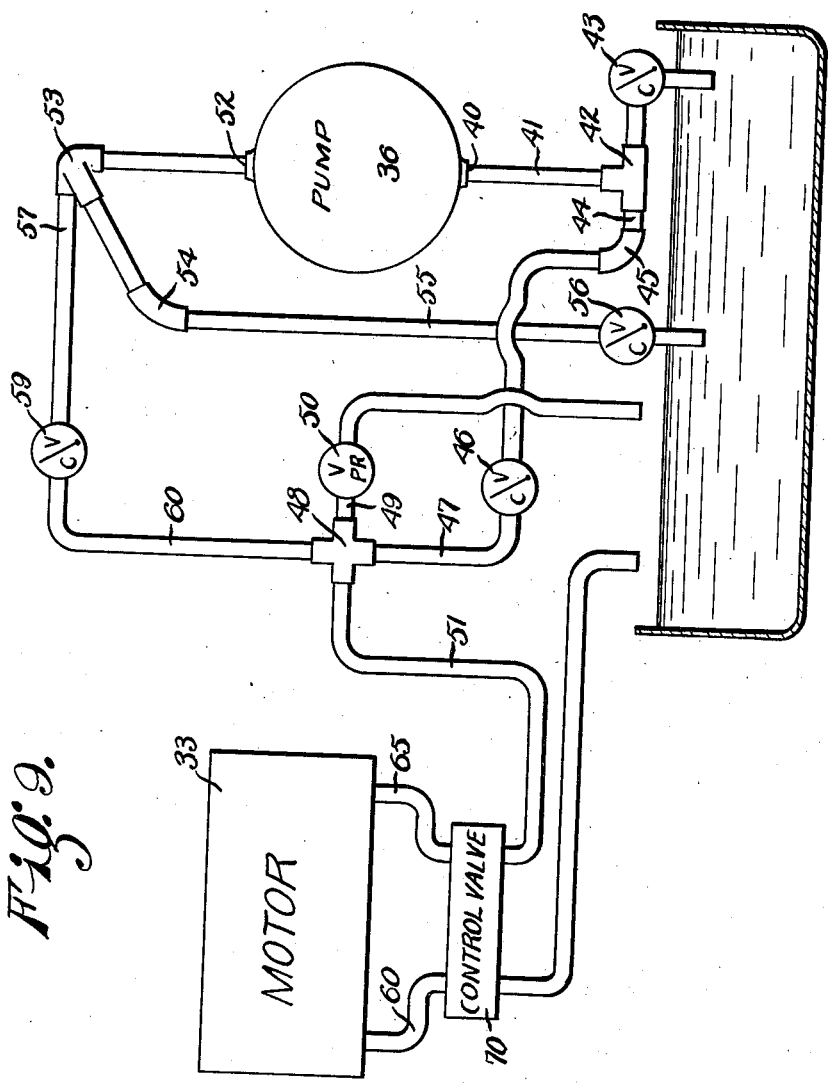

Patented Sept. 8, 1942

2,295,161

UNITED STATES PATENT OFFICE 2,295,161

HYDRAULIC CONTROL MECHANISM

Harry C. Clay, Columbus, Ind., assignor to Reeves Pulley Company, Columbus, Ind., a corporation of Indiana Application March 7, 1939, Serial No. 260,451

8 Claims. (Cl. 74—230.17)

The present application relates to a hydraulic control mechanism, and the mechanism is shown, in the present application, associated with a variable speed transmission of a particular type. The primary object of the invention is to provide a hydraulic control mechanism for shifting a movable element, said mechanism comprising a constantly driven rotary pump for supplying fluid under pressure to a fluid motor which, in turn, upon actuation of a valve, will operate to shift the movable controlled member to a degree and in a direction dependent upon the degree and direction of movement of the valve. A feature of the invention is the provision of conduit means connecting the pump with the motor and with a fluid reservoir in such a manner that, upon operation of the pump in one direction, a single flow path from the reservoir through the pump to the motor will be established, while, upon operation of the pump in the opposite direction, a different single flow path will be established from the reservoir, through the pump, and to the motor. While the control mechanism is illustrated in association with a particular type of variable speed transmission, it will be recognized that the control mechanism is applicable to other types of variable speed transmissions, and to the control of different mechanisms, in which a desired end is attained by positive movement of a controlled member in one direction or the other.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 3 is a plan view of the control unit, the housing being shown in section;

Fig. 4 is an enlarged sectional view through the fluid motor, taken substantially on the line 4—4 of Fig. 2, and looking in the direction of the arrows;

Fig. 5 is a sectional view of the variable speed transmission with which the control mechanism is shown associated;

Fig. 6 is an enlarged end elevation of the fluid motor cylinder and valve mechanism, the cylinder head being removed;

Fig. 7 is a section taken substantially on the line 7—7 of Fig. 6 and looking in the direction of the arrows;

Fig. 8 is an enlarged view of the telescopic tube through which fluid is supplied from the pump to the valve housing; and Fig. 9 is a schematic layout of the pump and motor.

Figure 1:
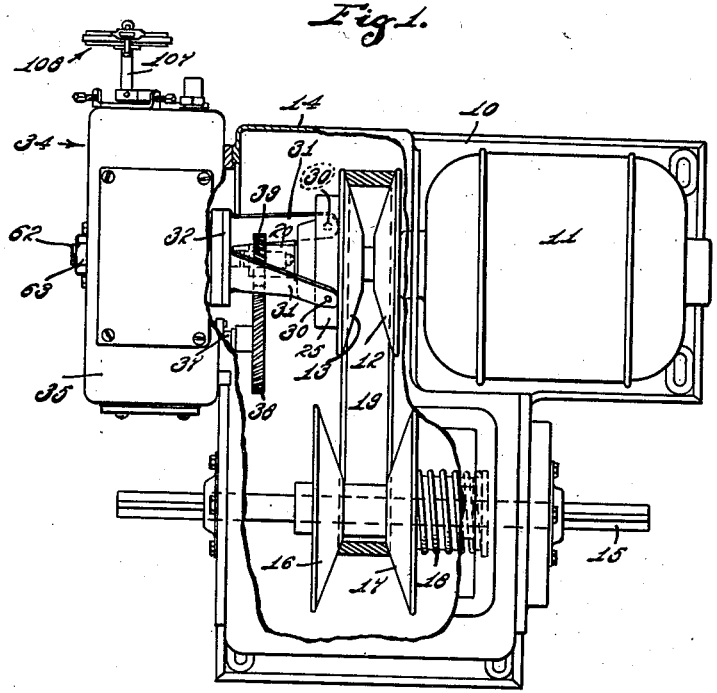
Fig. 1 is a plan, parts of the casing being broken away for clarity of illustration, showing my control associated with one type of variable speed transmission.

Referring more particularly to the drawings, it will be seen that I have illustrated a base 10 upon which is mounted an electric motor 11, upon the spindle of which is supported an expansible V-pulley comprising the mating coned discs 12 and 13. Preferably, the transmission will be enclosed within a housing 14 in which is journalled the driven shaft 15 of the transmission, said shaft carrying an expansible V-pulley comprising the discs 16 and 17. From an inspection of Fig. 5, it will be seen that the disc 12 is intended to be fixedly mounted upon the spindle of motor 11, and is provided with an elongated hub 20 upon which is slidably mounted the hub 21 of the mating disc 13. Said hub 21 carries one race 22 of a thrust bearing, the outer race 23 of which is provided with a pair of diametrically oppositely projecting pins 24 upon which is swiveled an equalizer ring 25.

Similarly, the disc 16 is fixed to the driven shaft 15 and is provided with an elongated hub 26 upon which is slidably mounted the disc 17, a spring 18 being sleeved over the hub 27 of the disc 17, and bearing against a stop nut 28 mounted on the hub 26, to urge said disc 17 constantly resiliently toward the disc 16. The two pulleys are drivingly connected by a V-belt 19.

The equalizer ring 25 is provided with two oppositely projecting radial pins 30, ninety degrees removed from the pins 24, to which are swiveled the arms 31 of a yoke carried by one head 32 of the cylinder 33 of a fluid motor forming a part of the hydraulic control mechanism indicated generally by the reference numeral 34.

Figure 2:
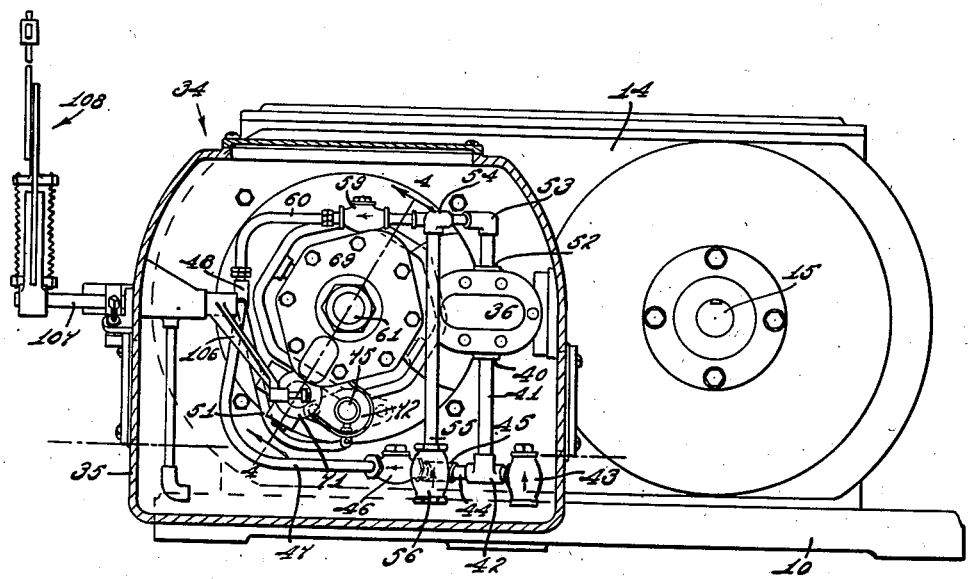
Fig. 2 is a somewhat enlarged side elevation of the said mechanism, looking from the left of Fig. 1, the housing of the control unit being shown in section.

Said mechanism is preferably enclosed with a casing 35 which acts as a fluid reservoir, and includes a fluid pump 36 of the rotary, reversible type. The shaft 37 of said pump carries a gear 38 meshing with a pinion 39 carried on the hub 20, whereby said pump shaft 37 is constantly driven by the motor 11 at constant speed. Since the transmission manufacturer cannot be sure whether his organization will be associated with a motor which runs clockwise or with a motor which runs counter-clockwise, it is highly desirable that the pump 36 shall be of such character as to operate when driven in either direction; and that means shall be provided whereby, no matter in which direction the pump 36 is driven, fluid will be drawn from the reservoir 35 and discharged to the fluid motor cylinder 33. I have accomplished that objective by the system of conduits and check valves disclosed most particularly in Figs. 2, 3, and 9.

The pump 36 is provided with a port 40 which is connected, by a pipe 41, with the stem of a T-fitting 42, one branch of which communicates with a check valve 43 so constructed as to permit upward flow only therethrough. The other branch of said T-fitting 42 is connected, by pipe 44 and elbow 45, with a check valve 46 so constructed as to permit flow therethrough toward the left only as viewed in Figs. 2 and 9. The outlet port of said check valve 46 is connected, by a pipe 47, with one branch of a four-way fitting 48. A second branch of said fitting is connected, by pipe 49, with an adjustable relief valve 50; so that, during periods when flow to the fluid motor is cut off, fluid discharged from the pump 36 may be returned to the reservoir through said relief valve 50.

From a third branch of the fitting 48 leads a pipe 51 for supplying fluid to the fluid motor, through a flow path hereinafter to be described.

The opposite port 52 of the pump 36 is connected to a three-way fitting 53, one branch of which is connected, through elbow 54 and pipe 55, with a check valve 56 so constructed as to permit flow upwardly therethrough only. The other branch of said fitting 53 is connected, by pipe 57 and elbow 58, with a check valve 59 so constructed as to permit flow therethrough to the left only, as viewed in Figs. 2 and 9. A pipe 60 connects the outlet of the valve 59 with the fourth branch of the fitting 48.

It follows that, when the pump 36 is driven in one direction, liquid will be drawn upwardly from the reservoir through the check valve 43, T 42, and pipe 41, through the pump 36, fitting 53, pipe 57, valve 59, and pipe 60 to the four-way fitting 48, whence it will flow either through the relief valve 50 or through the supply pipe 51 to the fluid motor. If the pump 36 is driven in the opposite direction, however, liquid will be drawn upwardly from the reservoir through the valve 56, pipe 55, elbow 54, fitting 53, and port 52 through the pump and, through port 40, pipe 41, T 42, pipe 44, elbow 45, valve 46, and pipe 47 to the fitting 48, whence it will flow either through the relief valve 50 or through the supply pipe 51 to the fluid motor. This selection of flow paths, dependent upon the direction of rotation of the pump 36, will be seen to be entirely automatic, requiring no manipulation by the operator.

A piston rod 61 has one end 62 thereof fixedly mounted in the wall 73 of the housing 35, by means of nuts 63; and said piston rod fixedly carries a piston 64. Said piston 64 is received within the cylinder 33; and it will be obvious that fluid under pressure, supplied to the cylinder 33, will cause movement of the cylinder with respect to the fixed piston 64.

From the wall of the cylinder 33 projects a protuberance indicated generally by the reference numeral 70, and formed to provide a valve housing 71, and a supply tube 72. The valve housing 71 is formed with a bore 83, and the supply tube 75 is formed with a parallel bore having an intermediate enlargement 79 between its ends 80 and 81. Within the protuberance 70 are formed two passages 65 and 66 opening paraxially into the bore 83, and leading to opposite ends of the cylinder 33, through passages 67 and 68 respectively formed in the respective cylinder heads 32 and 69.

The flanged end 74 of an elongated tube 75 which is closed at both ends, is secured fixedly to the wall 73 in any suitable manner. Near its end remote from the flange 74, said tube is provided with a radial inlet port 76, to which is connected the discharge end of the pipe 51, and which communicates with the chamber 77 formed within the tube 75. Intermediate its ends, the tube 75 is formed with one or more radial ports 78.

The supply tube 72 is sleeved on the tube 75, the opposite end portions 80 and 81 thereof snugly fitting upon the tube 75 and being preferably provided with oil sealing grooves, as shown. The assembly 70 is slidable upon the tube 75, moving with the cylinder 33 as said cylinder is reciprocated. The axial extent of the enlarged portion 79 of the bore of the supply tube is at least equal to the axial stroke of the cylinder 33, and the assembly 70 is so associated with the tube 75 that the port 78 is always in communication with the enlarged portion 79.

A passage 82 leads from the enlarged portion 79 into the valve housing bore 83. Within said bore is mounted a valve cage 84 provided with an external peripheral groove 85 communicating with the passage 82 and with a peripheral series of ports 86 leading into the bore 87 of said cage, in which is reciprocably mounted a valve 88 of the piston type having a plurality of peripheral lands 89, 90, 91, and 92. Said valve cage is further provided with a peripheral series of ports 93 leading from the bore 87 into an external peripheral groove 94 communicating with the mouth of the passage 65. Said cage is further formed with an external peripheral groove 96 communicating with a peripheral series of ports 97 leading from the bore 87, and with a discharge port 98 at one end of the valve housing.

At the opposite side of the groove 85, the valve cage is formed with an external peripheral groove 99 communicating with a peripheral series of ports 100 leading to the bore 87, and with the mouth of the passage 66. Said cage is further formed with a peripheral series of ports 102 leading from the bore 87 to an external peripheral groove 103 formed in the valve cage and communicating with a discharge port 104 at the opposite end of the valve housing.

It will be seen that, if the valve 88 is shifted to the right from the position illustrated in Fig. 7, fluid may flow from the fitting 48 through the pipe 51 and port 76 into the bore 77 of the tube 75, and thence through port 78 into supply tube enlargement 79, whence fluid will flow, through passage 82, groove 85, ports 86, bore 87, ports 93, and groove 94, and thence through passages 65 and 67 into the right-hand end of cylinder 33, tending to move said cylinder 33 to the right. Simultaneously, liquid will flow from the left-hand end of cylinder 33, through passages 68 and 66, groove 99, and ports 100 into bore 87, and thence through ports 102, groove 103 and outlet port 104 back into the reservoir 35.

The movement of the cylinder 33 toward the right, consequent upon such adjustment of the valve, will carry with it the valve housing 71, thereby shifting the ports 93 and 100 with respect to the valve 88, to close said ports once more.

Obviously, adjustment of the valve toward the left will similarly open ports 100 and 93 to provide communication between the passage 82 and the passage 66, and to provide communication between the passage 65 and the discharge port 98, causing movement of the cylinder 33 toward the left.

It will be clear that movement of the cylinder 33 toward the right will shift the disc 13 toward the disc 12 to squeeze the belt 19 outwardly between said discs, thereby pulling the belt more deeply between the discs 16 and 17 to force the disc 17 to move toward the right, whereby the speed ratio of the transmission will be increased. Similarly, movement of the cylinder 33 toward the left will shift the disc 13 away from the disc 12, whereupon the spring 18 will be permitted to force the disc 17 toward the disc 16, to decrease the speed ratio of the transmission.

The valve 88 is provided with a projecting stem 105 to which is connected an arm 106 mounted upon a rock shaft 107, adapted to be moved, in one direction or the other, by a safety shifter of well known type, indicated generally by the reference numeral 108.

I claim as my invention:

1. In combination, a variable speed transmission comprising a casing, a driving shaft rotatably positioned in said casing, an expansible V-pulley on said driving shaft and comprising two oppositely facing coned discs, at least one of said discs being axially shiftable, a driven shaft rotatably positioned in said casing, an expansible V-pulley on said driven shaft and comprising two oppositely facing coned discs, at least one of said discs being axially movable, a V-belt providing a driving connection between said V-pulleys, said casing being provided with an aperture in its wall adjacent one of said shiftable discs and means for shifting said one disc, comprising a housing, a fluid pump in said housing, and a fluid motor in said housing, said housing being formed with an aperture in one wall and being secured to said casing with said housing aperture in registry with said casing aperture, said motor comprising a cylinder operatively connected to said one disc, and a piston in said cylinder and fixed with respect to said housing, and means for controlling fluid flow from said pump to and from opposite ends of said cylinder.

2. In combination, a variable speed transmission comprising a casing, a driving shaft rotatably positioned in said casing, an expansible V-pulley on said driving shaft and comprising two oppositely facing coned discs, at least one of said discs being axially shiftable, a driven shaft rotatably positioned in said casing, an expansible V-pulley on said driven shaft and comprising two oppositely facing coned discs, at least one of said discs being axially movable, a V-belt providing a driving connection between said V-pulleys, said casing being provided with an aperture in its wall adjacent one of said shiftable discs, and means for shifting said one disc, comprising a housing, a fluid pump in said housing, and a fluid motor in said housing, said housing being formed with an aperture in one wall and being secured to said casing with said housing aperture in registry with said casing aperture, said motor comprising a cylinder operatively connected to said one disc, and a piston in said cylinder and fixed with respect to said housing, and means for controlling fluid flow from said pump to and from opposite ends of said cylinder, said last-named means comprising a group of elements including a valve housing having ports communicating with the opposite ends of said cylinder and a port communicating with said pump, and a valve movably mounted in said valve housing to control said ports, one of said elements being movable with the cylinder.

3. In combination, an electric motor having a spindle, a casing, an expansible V-pulley mounted on said spindle within said casing and comprising a pair of mating coned discs, one of said discs being axially shiftable with respect to its mate, a driven shaft, a resiliently expansible V-pulley mounted on said driven shaft within said casing and comprising a pair of mating coned discs, one of said discs being spring-urged toward its mate, a V-belt providing a driving connection between said V-pulleys, and a hydraulic control unit comprising a housing providing a liquid reservoir, said housing being mounted upon said casing and the interior of said housing being in communication with the interior of said casing, a pump in said housing drawing liquid from said reservoir and supplying the same to a fluid motor comprising a cylinder received in said housing and operatively connected to said first-named shiftable disc and a piston received in said cylinder and fixed with respect to said housing, and means for controlling the flow of fluid from said pump to and from opposite ends of said cylinder.

4. In combination, an electric motor having a spindle, a casing, an expansible V-pulley mounted on said spindle within said casing and comprising a pair of mating coned discs, one of said discs being axially shiftable with respect to its mate, a driven shaft, a second V-pulley mounted on said driven shaft within said casing and comprising a pair of mating coned discs, one of said discs being axially shiftable with respect to its mate, means for causing movement of said last-named shiftable disc in response to movement of said first-named shiftable disc, a V-belt providing a driving connection between said V-pulleys, and a hydraulic control unit comprising a housing providing a liquid reservoir, said housing being mounted upon said casing and the interior of said housing being in communication with the interior of said casing, a pump in said housing drawing liquid from said reservoir and supplying the same to a fluid motor comprising a cylinder received in said housing and operatively connected to said first-named shiftable disc and a piston received in said cylinder and fixed with respect to said housing, and means for controlling the flow of fluid from said pump to and from opposite ends of said cylinder.

5. In combination, a variable speed transmission comprising a casing, a driving shaft rotatably positioned in said casing, an expansible V-pulley on said driving shaft and comprising two oppositely facing coned discs, at least one of said discs being axially shiftable, a driven shaft rotatably positioned in said casing, an expansible V-pulley on said driven shaft and comprising two oppositely facing coned discs, at least one of said discs being axially movable, a V-belt providing a driving connection between said V-pulleys, said casing being provided with an aperture in its wall adjacent one of said shiftable discs, and means for shifting said one disc, comprising a housing, a fluid pump in said housing, means connecting said transmission to drive said pump, and a fluid motor in said housing, said housing being formed with an aperture in one wall and being secured to said casing with said housing aperture in registry with said casing aperture, said motor comprising a cylinder operatively connected to said one disc, and a piston in said cylinder and fixed with respect to said housing, and means for controlling fluid flow from said pump to and from opposite ends of said cylinder.

6. In combination, a variable speed transmission comprising a casing, a driving shaft rotatably positioned in said casing, an expansible V-pulley on said driving shaft and comprising two oppositely facing coned discs, at least one of said discs being axially shiftable, a driven shaft rotatably positioned in said casing, an expansible V-pulley on said driven shaft and comprising two oppositely facing coned discs, at least one of said discs being axially movable, a V-belt providing a driving connection between said V-pulleys, said casing being provided with an aperture in its wall adjacent one of said shiftable discs, and means for shifting said one disc, comprising a housing, a fluid pump in said housing, means providing a driving connection between said driving shaft and said pump, and a fluid motor in said housing, said housing being formed with an aperture in one wall and being secured to said casing with said housing aperture in registry with said casing aperture, said motor comprising a cylinder operatively connected to said one disc, and a piston in said cylinder and fixed with respect to said housing, and means for controlling fluid flow from said pump to and from opposite ends of said cylinder.

7. In combination, an electric motor having a spindle, a casing, an expansible V-pulley mounted on said spindle within said casing and comprising a pair of mating coned discs, one of said discs being axially shiftable with respect to its mate, a driven shaft, a resiliently expansible V-pulley mounted on said driven shaft within said casing and comprising a pair of mating coned discs, one of said discs being spring-urged toward its mate, a V-belt providing a driving connection between said V-pulleys, and a hydraulic control unit comprising a housing providing a liquid reservoir, said housing being mounted upon said casing and the interior of said housing being in communication with the interior of said casing, a pump in said housing drawing liquid from said reservoir and supplying the same to a fluid motor comprising a cylinder received in said housing and operatively connected to said first-named shiftable disc and a piston received in said cylinder and fixed with respect to said housing, meshing gears on said motor spindle and on the shaft of said pump, and means for controlling the flow of fluid from said pump to and from opposite ends of said cylinder.

8. In combination, an electric motor having a spindle, a coned disc fixed to said spindle, a mating coned disc axially shiftable with respect to said first disc, a fluid motor operatively connected to shift said second disc with respect to said first disc, a fluid pump, said spindle projecting beyond the outermost position of said shiftable disc, and means carried by the projecting portion of said spindle and connecting said spindle to drive said pump, and means for controlling fluid flow from said pump to said motor.

HARRY C. CLAY.